June 6, 1950          H. FROMM          2,510,809
FRUIT JUICE EXTRACTOR OSCILLATORY STRAINER
Filed Jan. 23, 1948          3 Sheets—Sheet 1
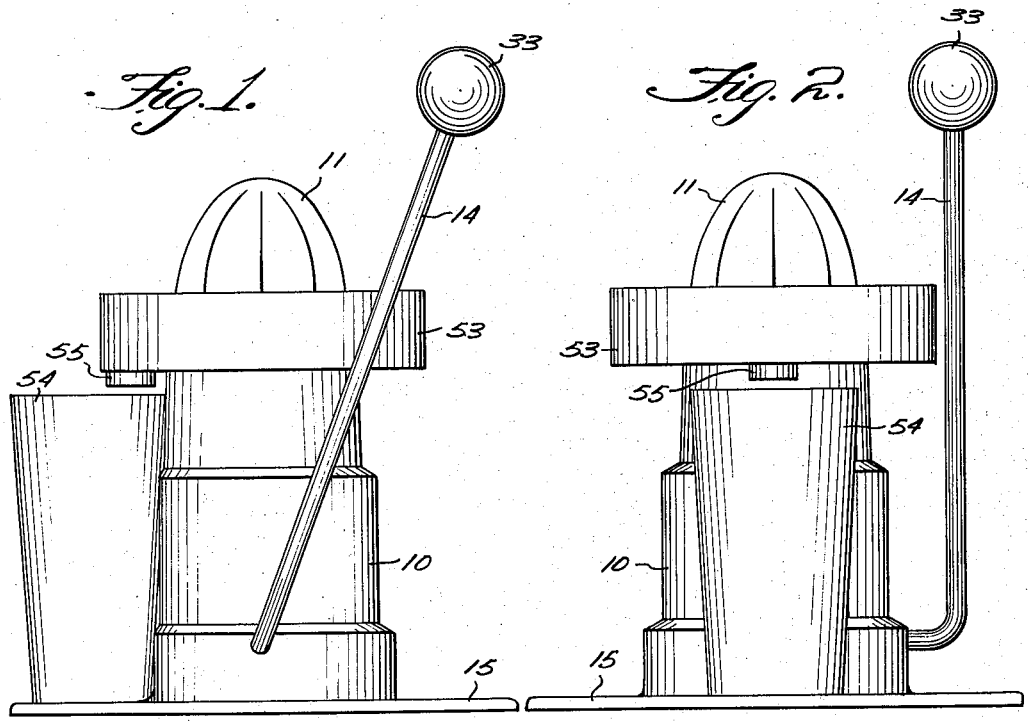
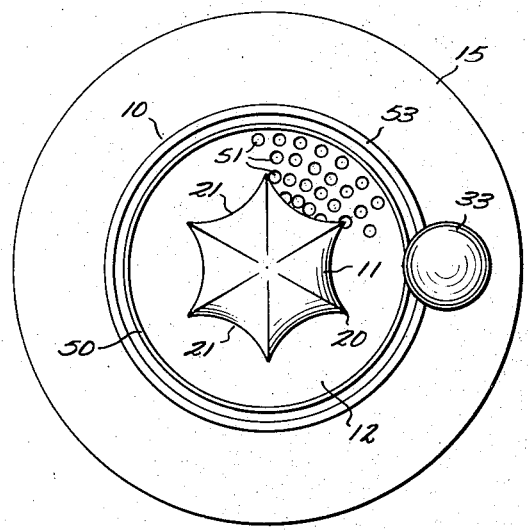
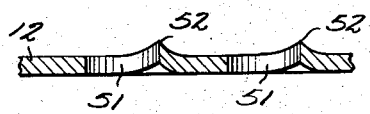
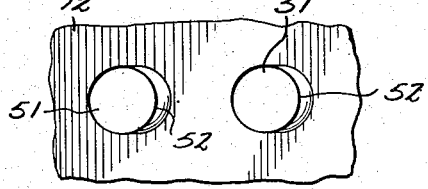
INVENTOR.
Herbert Fromm,
BY Victor J. Evans & Co.
ATTORNEYS

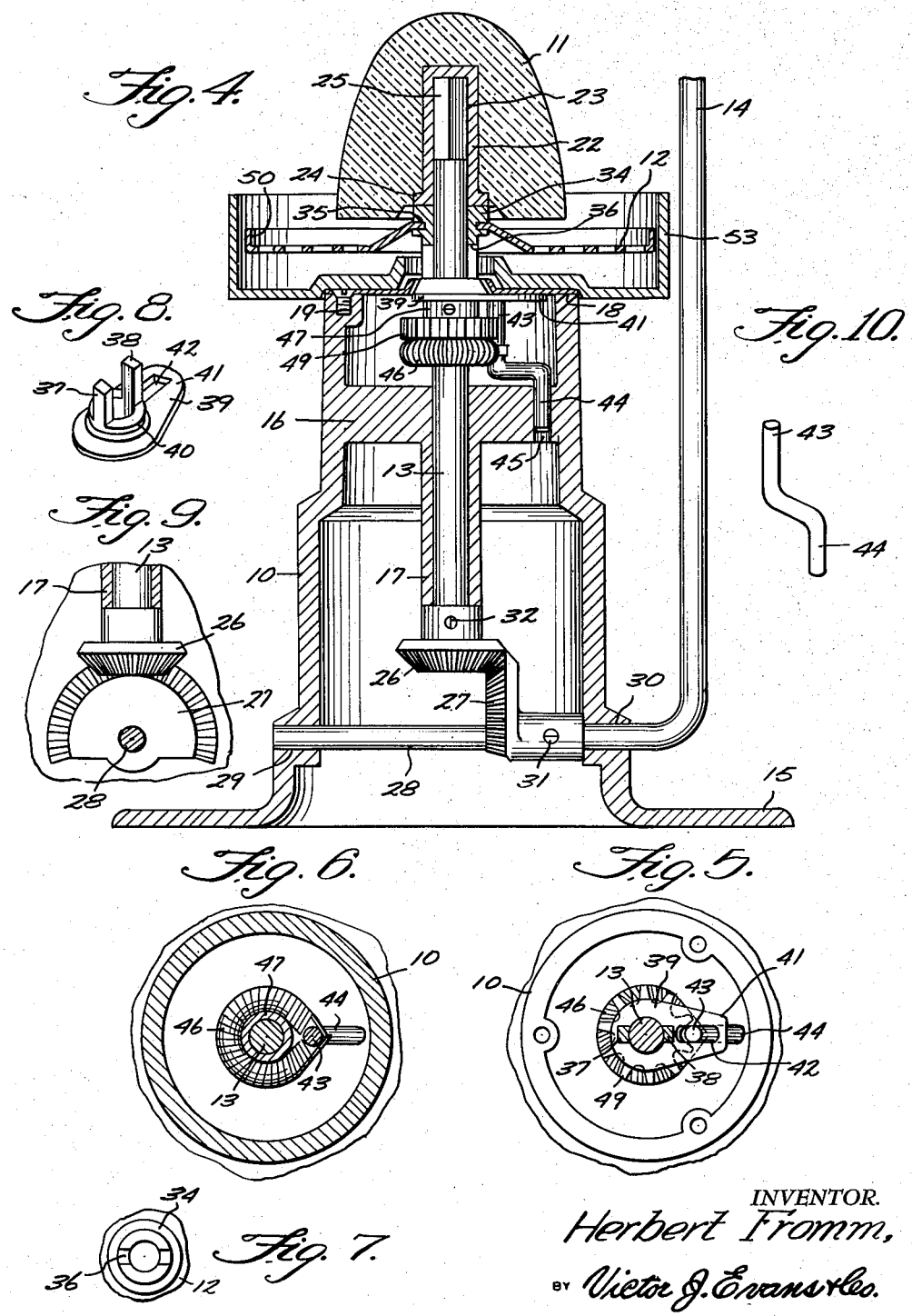

June 6, 1950 H. FROMM 2,510,809
FRUIT JUICE EXTRACTOR OSCILLATORY STRAINER
Filed Jan. 23, 1948 3 Sheets-Sheet 3
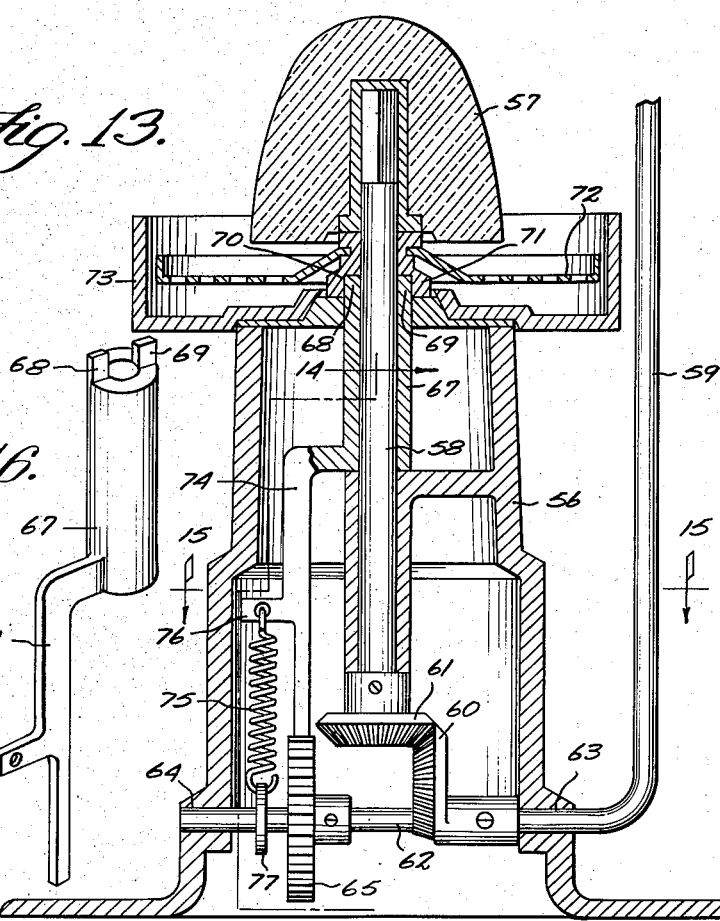
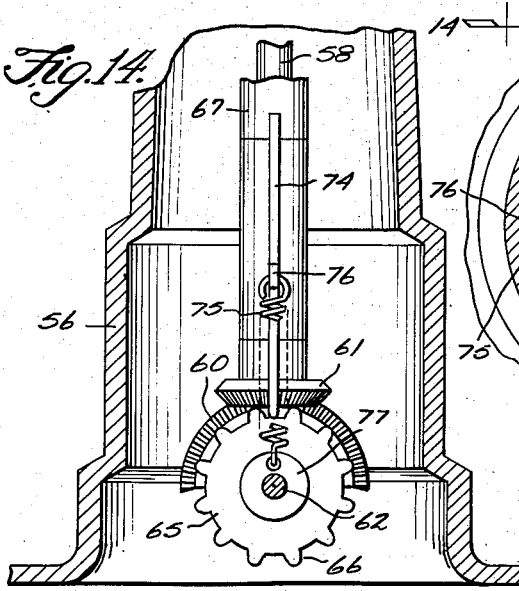
INVENTOR.
Herbert Fromm,
BY Victor J. Evans & Co.
ATTORNEYS Patented June 6, 1950

2,510,809

UNITED STATES PATENT OFFICE 2,510,809

FRUIT JUICE EXTRACTOR OSCILLATORY STRAINER

Herbert Fromm, Jumbo Gardens, Ontario, Canada

Application January 23, 1948, Serial No. 3,934

1 Claim. (Cl. 146—3)

This invention relates to fruit juice extractors and strainers used for removing juice and pulp from the halves of citrus fruits, such as oranges, lemons, grapefruit, and the like, and in particular a fruit juicer having a fluted conical-shaped reamer in combination with a strainer in which the parts are manually actuated and the reamer operates with a reciprocating movement while the strainer moves slowly a short distance with the reamer and is snapped backward, performing a plurality of such movements with each movement of the reamer, thereby accomplishing a chopping or grating action which reduces the pulp to comparatively fine particles increasing the quantity of juice recovered from fruit.

These instrumentalities cause the strainer to operate with an oscillating or escapement action and being spring activated produces a violent action with a sudden stop. This action of the strainer is independent of and unrelated to the speed of the reamer, and is not controlled by the operator.

The object of this invention is to provide a fruit juicer having a fluted reamer for removing the juice and pulp from the fruit and a strainer wherein the parts are actuated with different movements by a common handle.

Another object of the invention is to provide means for operating a strainer of a fruit juicer having a reamer with a relatively quick snappy or jerky action.

Another object of the invention is to provide a manually actuated fruit juicer in which the operating power is applied at a relatively low elevation in the device in order to prevent overturning of the juicer in use.

A further object of the invention is to provide an efficient manually actuated juicer for citrus fruits and the like which includes a reamer and a strainer with each operating with different movements, which is of a simple and economical construction.

With these and other objects and advantages in view the invention consists of the new and novel combination, construction, and arrangement of parts as hereinafter more fully described, set forth in the claims appended hereto, and disclosed in the accompanying drawings forming part hereof, wherein:

Figure 1 is a view showing a side elevation of the juice extractor and strainer.

Figure 2 is a view showing a front elevation of the device.

Figure 3 is a plan view of the device.

Figure 4 is a vertical section through the device showing the juicer and strainer with the operating elements therefor, and with parts shown in elevation.

Figure 5 is a sectional plan taken on line 5—5 of Figure 4, showing the strainer actuating element with parts omitted and parts broken away.

Figure 6 is a similar section taken on line 6—6 of Figure 4 showing the spring for actuating the strainer.

Figure 7 is a detail taken on line 7—7 of Figure 4 showing the key slots in the hub of the strainer with parts omitted and parts broken away.

Figure 8 is a detail showing the strainer actuator.

Figure 9 is a section through the lower part of the device with parts broken away, showing the operating gears.

Figure 10 is a detail showing the actuator crank.

Figure 11 is a detail showing a section through the strainer, with parts broken away.

Figure 12 is a detail showing a plan view of a section of the strainer with parts broken away.

Figure 13 is a vertical section similar to the section shown in Figure 4 illustrating a modification wherein alternate means is provided for actuating the strainer.

Figure 14 is a detail showing a section taken on line 14—14 of Figure 13 showing the strainer actuator, and with parts broken away.

Figure 15 is a sectional plan taken on line 15—15 of Figure 13, with parts broken away.

Figure 16 is a detail showing the strainer actuator element.

Referring now to the drawings wherein like reference characters indicate corresponding parts the fruit juice extractor and strainer of this invention include a housing 10, a reamer 11, a strainer 12, a shaft 13, and a handle 14.

The housing 10 is provided with a base flange 15 and a horizontally disposed partition 16 with a downwardly extending sleeve 17 forming a bearing for the shaft 13, and the upper end of the housing is provided with a cover plate 18 that is held in position by screws 19.

The reamer 11 is formed with ridges 20 and grooves 21 forming flutes in the surface and the outer part is mounted on a sleeve 22 having a socket 23 with flat sides in the upper end and a flange 24 around the lower end. The upper end of the shaft 13 is also formed with flat sides 25 so that as the shaft reciprocates the reamer will also reciprocate, and on the lower end of the shaft is a gear 26 that meshes with a gear segment 27 on the lower end 28 of the handle. The lower end 28 of the handle is rotatably mounted in bearings 29 and 30 of the housing and the segment 27 is fixedly mounted thereon by a set screw 31. The hub of the gear 26 is also provided with a set screw 32 by which it is held on the shaft 13, and the outer end of the handle is provided with a knob 33.

The strainer 12 is provided with a bushing 34 having an annular recess 35 in which the strainer is held and the lower end of the bushing is formed with key slots 36 into which the upper ends of keys 37 and 38 extend and the keys are integral with an actuator 39 having a hub 40 and an arm 41 with a slot 42 therein. The actuator is freely mounted on the shaft 13 and the upper end 43 of the crank 44, which is pivotally mounted in an opening 45 of the partition 16, extends into the slot 42, and is resiliently held inward by a spring 46. The spring 46 is positioned on a hub or wheel 47 that is fixedly mounted on the shaft 13 through a set screw 48 and the hub is provided with spaced teeth 49 between which the end 43 of the crank is held by the spring 46. It will be noted, particularly in Figure 5, that as the shaft 13 is rotated in either a clockwise or counterclockwise direction the upper end 43 of the crank 44, the lower end being pivoted in the opening 45, will travel outward in the slot 42 of the actuator 39, moving the strainer slowly in the same direction of rotation as that of the reamer until the upper end rides off of one of the teeth 49 of the hub 47, and as the end of the crank rides off of the tooth the spring 46 will snap the end of the crank backward thereby returning the strainer with a quick snappy movement, providing an oscillating strainer with a reciprocating reamer. The comparatively close spacing of the teeth causes the strainer to move forward and snap backward a plurality of times as the operating crank is moved from one position to another.

The strainer 12 is provided with a peripheral flange 50 and the surface of the strainer is formed with perforations or openings 51 the edges of which are curved upwardly as shown in Figure 11, providing cutting edges 52. With the strainer formed in this manner the pulp of the fruit is subjected to a grating action which is accentuated by the quick snappy movement of the strainer, which when released, is snapped against a stop.

As the juice is removed it passes through the strainer into the tray 53 from which it may flow through a spout 54 into a container 55.

In the design shown in Figures 13 to 16 the device is formed with a housing 56, similar to the housing 10 and a reamer 57 is mounted on a shaft 58 and operated by a crank 59 through gears 60 and 61. The lower end 62 of the crank is journaled in bearings 63 and 64 of the housing and a cam 65 with teeth 66 thereon is mounted on the end 62. In this design a sleeve 67 is freely mounted on the shaft 58 and the upper end of the sleeve is formed with keys 68 and 69, similar to the keys 37 and 38 of the actuator 39, which extend into recesses 70 of a bushing 71 similar to the bushing 34. The strainer 72 is mounted in the bushing 71 and positioned in a tray 73 below the reamer 57.

The lower end of the sleeve 67 is provided with an arm 74 that extends downward with the lower end thereof positioned to engage the teeth 66 of the cam 65, and as the cam rotates the teeth thereof will push the arm 74 toward either side rotating the sleeve 67 and thereby actuating the strainer. The arm, sleeve, and strainer are returned by a spring 75, one end of which is attached to a projection 76 on the arm and the other to a collar 77 which is freely mounted on the end 62 of the crank.

With the parts arranged in this manner one-half of an orange or the like may be held on the reamer and the reamer and strainer may be actuated, as described, by moving the handle 14 forward and backward by hand.

It will be understood that other modifications may be made in the design and arrangement of the parts without departing from the spirit of the invention.

What is claimed is:

A fruit juice extracting and straining device comprising, a vertically disposed housing, a vertically positioned shaft rotatably mounted in the housing, a handle pivotally mounted in the housing, means connecting the shaft to the handle for operation of the shaft by the handle, a fluted reaming element mounted on the upper end of the shaft, a horizontally disposed strainer also mounted on the shaft positioned below the reamer element, said strainer having key slots in the lower surface, a hub having an extended slotted arm and keys to correspond with the key slots of the strainer rotatably mounted on the shaft, a toothed wheel also mounted on the shaft, a crank pivotally mounted in the housing and positioned to engage the said toothed wheel, one end of said crank extended into the slot of the said slotted arm of the hub, said crank being actuated through part of a revolution by the said toothed wheel whereby the strainer is actuated in one direction, a spring connected to the crank whereby the crank actuates the strainer in the return movement when the crank is released from the toothed wheel, and a tray with a spout therein for receiving juices from the strainer.

HERBERT FROMM.

REFERENCES CITED

The following references are of record in the file of this patent:

UNITED STATES PATENTS

| Number | Name | Date |
|---|---|---|
| 625,507 | Hunt | May 23, 1899 |
| 2,160,388 | Morse | May 30, 1939 |
| 2,186,672 | Fromm | Jan. 9, 1940 |
| 2,249,817 | Fromm | July 22, 1941 |